United States Patent Office 3,563,930
Patented Feb. 16, 1971

3,563,930
CEMENT COMPOSITION
Michael A. Stram, Chicago, Jerry A. Dieter, Park Forrest, Richard J. Pratt, Flossmoor, and David W. Young, Homewood, Ill., assignors, by mesne assignments, to Atlantic Richfield Company, New York, N.Y., a corporation of Pennsylvania
No Drawing. Filed Apr. 1, 1968, Ser. No. 717,962
Int. Cl. C04b 7/02; C08g 51/04; C08k 1/02
U.S. Cl. 260—40                    14 Claims

ABSTRACT OF THE DISCLOSURE

Air entrainment in portland cements is increased by the addition to the cement prior to curing of minor amounts of water-soluble salts of styrene-maleic anhydride copolymers or the water-soluble half-esters or the water-soluble salts of half-esters of styrene-maleic anhydride copolymers and alkoxy polyalkylene glycols or other alcohols. Increased air entrainment in the cement provides superior durability and resistance.

This invention relates to portland cements which have been modified by the addition of polymers so as to provide greater air entrainment in the cement thereby increasing durability. More particularly, this invention is concerned with a portland cement which has been modified by the addition, prior to curing, of small amounts of the water-soluble salts of styrene-maleic anhydride copolymers or the water-soluble half-esters or water-soluble salts of half-esters of alkoxy polyalkylene glycol or other alcohols and styrene-maleic anhydride copolymers.

It is well known in the art that it is important in order to insure satisfactory durability that cured cement or concrete contain a certain amount of entrained air. Air entrained concrete is, for example, more resistant to surface scaling caused by frost action and direct application of salt for ice and snow removal. In addition it has been found that concrete with sufficient air entrained in it has greater resistance to abrasion and water penetration, and has increased workability and greater cohesiveness. Numerous materials have been employed in concrete to entrain air, such as natural wood resins, animal or vegetable fats and oils and their fatty acids, wetting agents such as the salts of sulfated or sulfonated organic compounds and water-soluble soaps of resin acids. These materials have the disadvantage, however, that, while cured concrete containing them has improved air entrainment, it also has significantly decreased compressive strength. These materials have the further disadvantage that they often cause excessive foaming which may interfere with the formulation and use of the concrete mix.

It is therefore an object of this invention to provide hydraulic cement having improved air entraining properties and reduced foaming while substantially maintaining its compressive strength. It is, additionally, an object of this invention to provide an air entraining agent for portland cement composition having greater surface activity and corrosion inhibiting properties.

These and other objects are accomplished in the present invention by providing a composition comprising a major amount of a portland cement, which consists principally of calcium silicates and aluminates and a minor amount, sufficient to increase air entrainment in the portland cement, of the water-soluble salt of a low molecular weight styrene-maleic anhydride copolymer or the water-soluble salt of a half-ester of the styrene-maleic anhydride copolymer. When such half-esters are themselves water-soluble they can be used as such as the air-entraining additive in the compositions of this invention and thus need not be in salt form. It is not necessary that the salt-forming agent be added to the insoluble copolymer or to the half-ester prior to combination of the copolymer or half-ester with the portland cement. For example, the salt-forming, solubilizing agent can be added to the cement composition containing the copolymer or half-ester prior to or at the time of or after the addition of water required for hydration and curing. Thus the composition of this invention can be a dry mixture of portland cement and the styrene-maleic anhydride copolymer or half-ester which may be either water-soluble per se or capable of being solubilized subsequently by the addition of a suitable salt-forming agent. The solubilizing agent may be dissolved in the water which is to be added to the cement composition to effect hydration, and it is preferred that the resin be in water solution when combined with the portland cement.

The copolymers of this invention have a molecular weight of about 500 to 5000, preferably about 1500 to 2000, and a molar ratio of styrene to maleic anhydride of from about 1:1 to 5:1, preferably about 1:1 to 2:1. The half-esters of the copolymers can be an up to about 150% half-ester, preferably an up to about 100%, and often an about 25 to 75%, half-ester. A 150% half-ester is a styrene-maleic anhydride in which 75% of the total number of anhydride groups of the copolymer have been esterified.

The half-esters are formed with an alcohol having the general formula

ROH wherein R is a hydrocarbon, e.g. alkyl, group of 1 to about 10 carbon atoms, or an alkoxy polyalkylene glycol of average molecular weight up to about 5000, preferably about 350 to 1000 and having the general formula $R'(OS_xH_{2x})_yOH$ wherein R' is an aliphatic hydrocarbon group having from 1 to about 10 carbon atoms, $x$ is 2 to 4, preferably 2, and $y$ is 1 to about 150, preferably 3–10, and most preferably about 7, particularly when $x$ is 2. The water-solubility of the half-esters can depend on the hydroxyl material used in forming the esters. Thus longer hydrocarbon chains in the hydroxy-bearing reactant decrease the water-solubility of the half-ester, while longer polyether chains in such reactant enhance the water-solubility of the half-ester.

It has been found that from about 0.005 to 0.1 weight percent, preferably about 0.01 to 0.06 weight percent, based on the weight of the portland cement per se, of the styrene-maleic anhydride copolymer additive of this invention is often effective as an air entrainer when incorporated into either the dry cement or the cement slurry prior to curing. It has also been found advantageous when using the copolymer additive of this invention as an air entraining agent to employ it in a solution having a pH of from about 7 to 9, preferably about 7.5 to 8.5. Neutralization to the desired pH and solubility where necessary, may be effected by reacting the copolymer or ester with ammonia, a suitable water-soluble amine or an alkali metal hydroxide such as, for example, sodium hydroxide to form the water-soluble salt. As examples of suitable amines which can be used to form the water-soluble salt may be mentioned high molecular weight, salt-forming amines having boiling points about 100° C. Typical amines are tertiary amines, such as for example, tributylamine, trifurfurylamine, and hydroxylalkyl amines of 2 to 4 carbon atoms in the alkyl groups such as, for example, triethanol amine. Glycol amines or capped glycol amines of molecular weights up to about 5000 are also suitable.

Preparation of the styrene-maleic anhydride copolymer can be by known methods. A preferred method is by solution polymerization where the monomers are polymerized in a suitable solvent, employing as a polymerization catalyst a free-radical catalyst, such as a peroxide, preferably benzoyl peroxide, dicumyl peroxide or an alkyl peroxy dicarbonate, at a temperature of about 75 to 300° C. or more. Suitable solvents include the aromatic hydrocarbon solvents, such as cumene, p-cymene, xylene, toluene, etc. Other suitable solvents are the ketones, such as methylethylketone. The preferred manner of carrying out the polymerization is by what is known as incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture.

TABLE I

| Wt. percent 30% ester of copolymer based on cement: | Percent air (ASTM C-185) volume |
|---|---|
| 0 | 8.09 |
| 0.0114 | 14.83 |
| 0.0570 | 21.33 |
| 0.1140 | 25.80 |

Table II compares air entrainment in portland cement using a 25% ester of a styrene-maleic anhydride copolymer having a molecular weight of about 1600 and a mole ratio of styrene to maleic anhydride of 1:1 and a methoxy polyethylene glycol of average molecular weight about 350.

TABLE II

| Wt. percent 25% ester of copolymer based on cement: | Percent air (ASTM C-185) volume |
|---|---|
| 0 | 8.09 |
| 0.0114 | 14.79 |
| 0.057 | 21.76 |
| 0.114 | 24.84 |

TABLE III

| Varying proportions and test results | Sample designation | | | | | | | | |
|---|---|---|---|---|---|---|---|---|---|
| | A | B | C | D | E | F | G | H | I |
| Air entraining agent, ml.[1] | 2.0 | 2.0 | 2.0 | 2.0 | 2.0 | 2.0 | 2.0 | 2.0 | 2.0 |
| Water, ml | 232.0 | 240.0 | 220.0 | 230.0 | 230.0 | 250.0 | 240.0 | 250.0 | 240.0 |
| Flow, percent | 84.0 | 93.0 | 80.0 | 88.0 | 86.0 | 92.0 | 92.0 | 95.0 | 86.0 |
| Air content, percent | 11.84 | 10.70 | 13.73 | 14.59 | 13.72 | 12.07 | 12.35 | 11.87 | 10.86 |
| Air entraining agent, ml.[1] | 10.0 | 10.0 | 10.0 | 10.0 | 10.0 | 10.0 | 10.0 | 10.0 | 10.0 |
| Water, ml | 202.0 | 220.0 | 200.0 | 188.0 | 200.0 | 210.0 | 200.0 | 220.0 | 210.0 |
| Flow, percent | 80.0 | 80.0 | 84.0 | 88.0 | 88.0 | 95.0 | 95.0 | 88.0 | 95.0 |
| Air content, percent | 15.94 | 12.53 | 18.21 | 21.76 | 21.11 | 18.74 | 19.50 | 15.80 | 17.30 |
| Air entraining agent, ml.[1] | 20.0 | 20.0 | 20.0 | 20.0 | 20.0 | 20.0 | 20.0 | 20.0 | 20.0 |
| Water, ml | 174.0 | 200.0 | 166.0 | 174.0 | 170.0 | 160.0 | 166.0 | 190.0 | 170.0 |
| Flow, percent | 80.0 | 80.0 | 84.0 | 92.0 | 84.0 | 92.0 | 95.0 | 95.0 | 95.0 |
| Air content, percent | 19.57 | 14.99 | 22.54 | 26.86 | 23.37 | 25.16 | 26.87 | 18.41 | 22.72 |

[1] 2.0 wt. percent of sodium salt of polymer at pH 7-8.

When an aromatic solvent is employed as the solvent for the polymerization, the formation of the copolymer causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation.

Example I illustrates the preparation of a typical 60% half-ester of a styrene-maleic anhydride copolymer.

EXAMPLE I

A mixture of 350 g. of methoxypolyethylene glycol of molecular weight about 350 and 225 g. of styrene-maleic anhydride copolymer having a mole ratio of styrene to maleic anhydride of 1:1 and a molecular weight of about 1600 was heated at 185–195° C. for 2.5 hours under nitrogen atmosphere. The reaction was performed in a resin kettle fitted with a stirrer, thermometer, and heating mantle. A portion of the reaction product was taken out and analyzed by alkali titration as having 30% of all carboxyls present converted to ester (i.e. a 60% half-ester). The pot was then neutralized at 160° F. to pH 7.0 with aqueous solution of sodium hydroxide. Approximately 7.0 grams of base were used and the ester completely dissolved.

A fraction of the neutralized ester was diluted with water to 2.0% total solids and tested for air-entrainment in a portland cement mortar according to the ASTM C-185 tests using proportions of 350 grams of portland Type I dry powder cement to 1400 grams of standard Ottawa sand (20/30). The results using different weight percentages of the polymer in the mortar are shown in Table I and compared with air-entrainment for mortar containing no polymer.

Additional tests were also made on a portland cement incorporating the following polymers:

Polymer A—Copolymer of styrene-maleic anhydride having a molecular weight of about 1600 and a styrene to maleic anhydride mole ratio of 1:1.

Polymer B—Copolymer of styrene-maleic anhydride having a molecular weight of about 1700 and a styrene to maleic anhydride mole ratio of 2:1.

Polymer C—70% half-ester of Polymer B and n-propyl alcohol.

Polymer D—100% half-ester of Polymer A and ethylene glycol butyl ether (butyl Cellosolve).

Polymer E—50% half-ester of Polymer A and ethylene glycol butyl ether (butyl Cellosolve).

Polymer F—77% half-ester of Polymer A and methoxy polyethylene glycol having a molecular weight of about 350.

Polymer G—100% half-ester of Polymer A and methoxytriethyleneglycol.

Polymer H—20% half-ester of Polymer A and methoxy polyethylene glycol having a molecular weight of about 2000.

Polymer I—14% half-ester of Polymer A and methoxy polyethylene glycol having a molecular weight of about 5000.

Table III compares air entrainment values for polymers A through F in portland cement compositions. Samples were tested according to ASTM C-185 method using proportions of 350 grams of portland Type I dry powder cement of 1400 grams of Standard Ottawa sand (20/30). Air content of the cement used in the tests without the air entrainment polymer was 9.17 percent by volume. The tests were run at room temperature.

As may be seen in Table III, all of the compositions tested gave superior air entrainment to the cement sample which did not contain an air entrainment additive. It may also be observed that generally the half-esters gave superior air entrainment values compared to corresponding amounts of the unesterified polymers.

Several of the polymers of this invention were also tested as air entrainment additives in portland cement compositions formulated as described in Example I at somewhat higher pH than the preferred range of 7–9 (i.e. polymers D and E at pH 10.5–11.0). Air entrainment values at the higher pH were somewhat lower than values obtained using solutions of the salts of the polymers in the pH range 7 to 9.

Table IV compares air entrainment and compressive strength for two esters of styrene-maleic anhydride copolymers and a commercially available air entraining agent.

TABLE IV

| Agent[1] | Wt. percent agent (based on cement wt.) | Vol. percent air | Compressive strength, p.s.i. (ASTM C-109) | | |
|---|---|---|---|---|---|
| | | | 3 days | 7 days | 28 days |
| Ester A | 0.040 | 19.0 | 1,682 | 2,418 | 3,775 |
| Ester B | 0.040 | 18.1 | 2,032 | 3,050 | 4,233 |
| Commercial agent | 0.026 | 18.1 | 1,433 | 2,384 | 3,350 |

[1] Ester A—100 percent half-ester of styrene-maleic anhydride polymer having a molecular weight of about 1,600 and a ratio of styrene to maleic anhydride of 1:1, and methoxy triethylene glycol. Ester B—60 percent half-ester of the styrene-maleic anhydride polymer of ester A and methoxy polyethylene glycol of molecular weight about 350.

ASTM, AASHO and Federal requirements for compressive strength of air entrained cement are 900 lbs. or more at 2 days, 1500 lbs. or more at 6 days, 2800 lbs. or more at 6 days. As may be seen the two esters of this invention exceed these requirements by a significantly greater margin than the commercial additive, while providing equal or better air entrainment.

Table V compares air entrainment and flow results using as an air entraining agent a 33 weight percent solution of a half-ester of this invention which was neutralized to a pH of 8 with triethanolamine. The half-ester was the 50 percent half-ester of a styrene-maleic anhydride polymer having a molecular weight of about 1600 and a mole ratio of styrene to maleic anhydride of 1:1 and methoxy polyethylene glycol having a molecular weight of about 350.

TABLE V

| Proportions and results | A | B |
|---|---|---|
| Air entraining agent, ml | 10.0 | 0 |
| Water, ml | 180.0 | 180.0 |
| Flow, percent | 80.0 | |
| Mortar,[1] grams | 730.0 | 730 |
| Air content, volume percent (including volume of A.E.A. as mixing water) (ASTM C-185) | 21.97 | 8.09 |

[1] 350 grams portland Type I cement/1,400 gms. standard Ottawa sand 20/30.

NOTE.—Column B shows the inferior air entrainment obtained when no agent was added to the mortar.

It is claimed:
1. A cement composition comprising portland cement and a minor amount, sufficient to increase air entrainment in the cured cement, of a compound selected from the group consisting of (A) styrene-maleic anhydride copolymers having molecular weights of from about 500 to 5000 and a mole ratio of styrene to maleic anhydride of from about 1:1 to 5:1, (B) the up to about 150% half-ester of said styrene-maleic anhydride copolymers and a member selected from the group consisting of alkanols of from 1 to about 10 carbon atoms and alkoxy polyalkylene glycols of average molecular weight of up to about 5000 having the formula $$R'(OC_xH_{2x})_yOH$$

in which $y = 1$ to about 150, $R'$ is an aliphatic hydrocarbon group having from 1 to about 10 carbon atoms and $x$ is 2–4.

2. The composition of claim 1 wherein the styrene-maleic anhydride copolymer or half-ester thereof is present in amounts from about 0.005 to 0.1 percent by weight based on the weight of the cement.

3. The composition of claim 1 wherein the ratio of styrene to maleic anhydride is from about 1:1 to 2:1, the copolymer is the up to about 100% half-ester of the alkoxy polyalkylene glycol having a molecular weight of about 350 to 1000, $y$ is about 3–10, $x$ is 2, and $R'$ is methyl.

4. The composition of claim 1 in which the copolymer or half-ester thereof is in water-soluble salt form with the salt form being selected from the group consisting of alkali metals, water-soluble amines, and ammonia.

5. The composition of claim 4 in which the half-ester is in the form of the sodium salt and is an approximately 100% half-ester of ethylene glycol butyl ether and a styrene-maleic anhydride copolymer having a molecular weight of about 1600 and a ratio of styrene to maleic anhydride of about 1:1.

6. The composition of claim 4 in which the half-ester is in the form of the sodium salt and is an approximately 50% half-ester of ethylene glycol butyl ether and a styrene-maleic anhydride copolymer having a molecular weight of about 1600 and a ratio of styrene to maleic anhydride of about 1:1.

7. The composition of claim 4 wherein the water-soluble salt form of said copolymer or half-ester is prepared by neutralizing said copolymer or half-ester to a pH of about 7–9.

8. The composition of claim 4 wherein said half-ester is the up to about 100% half-ester.

9. The composition of claim 4 wherein said water-soluble salt is the triethanolamine salt.

10. The composition of claim 9 in which the half-ester is an approximate 50% half-ester of a styrene-maleic anhydride copolymer having a molecular weight of about 1600 and a ratio of styrene to maleic anhydride of about 1:1 and methoxy polyethylene glycol having a molecular weight of about 350.

11. The composition of claim 1 wherein the ratio of styrene to maleic anhydride is from about 1:1 to 2:1, the copolymer is in the form of a water-soluble salt of a member selected from the group consisting of alkali metals, water-soluble amines, and ammonia, and said copolymer is the up to about 100% half-ester of the alkoxy polyalkylene glycol having a molecular weight of about 350 to 1000, $y$ is 3–10, $x$ is 2, and $R$ is methyl.

12. The composition of claim 11 wherein the copolymer is present in amounts from about 0.005 to 0.1 weight percent based on the weight of the cement.

13. The composition of claim 11 wherein said water-soluble salt is the sodium salt.

14. The composition of claim 4 wherein said water-soluble salt is the sodium salt.

References Cited
UNITED STATES PATENTS

| 2,227,200 | 12/1940 | Robie | 260—29.6SUX |
| 2,393,261 | 1/1946 | Peaker | 260—29.6SX |
| 3,085,986 | 4/1963 | Muskat | 260—41AX |
| 3,437,619 | 4/1969 | Nutt | 260—29.6SUX |

FOREIGN PATENTS

| 641,513 | 5/1962 | Canada | 106—90 |

TOBIAS E. LEVOW, Primary Examiner

H. M. S. SNEED, Assistant Examiner

U.S. Cl. X.R.

106—86, 88, 90; 260—29.6, 41